US011307036B2

(12) United States Patent
Uçar et al.

(10) Patent No.: US 11,307,036 B2
(45) Date of Patent: Apr. 19, 2022

(54) SYSTEMS AND METHODS FOR GUIDING OBJECT USING ROBOT

(71) Applicant: Toyota Motor Engineering & Manufacturing North America, Inc., Plano, TX (US)

(72) Inventors: Seyhan Uçar, Mountain View, CA (US); Baik Hoh, Campbell, CA (US); Kentaro Oguchi, Sunnyvale, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 177 days.

(21) Appl. No.: 16/581,842

(22) Filed: Sep. 25, 2019

(65) Prior Publication Data

US 2021/0088338 A1 Mar. 25, 2021

(51) Int. Cl.
| | | |
|---|---|---|
| *G01C 21/20* | (2006.01) | |
| *G01C 21/36* | (2006.01) | |
| *G05D 1/02* | (2020.01) | |
| *G05D 1/00* | (2006.01) | |
| *B64C 39/02* | (2006.01) | |

(52) U.S. Cl.
CPC .......... *G01C 21/206* (2013.01); *B64C 39/024* (2013.01); *G01C 21/3629* (2013.01); *G05D 1/0094* (2013.01); *G05D 1/0225* (2013.01); *G05D 1/0276* (2013.01); *B64C 2201/12* (2013.01); *B64C 2201/141* (2013.01)

(58) Field of Classification Search
CPC .................................................. G01C 21/206
See application file for complete search history.

(56) References Cited

U.S. PATENT DOCUMENTS 9,530,058 B2 * 12/2016 Moore ...................... G06T 7/70
9,659,503 B2 * 5/2017 Gordon .............. G01C 21/3407
(Continued)

FOREIGN PATENT DOCUMENTS

| CN | 103126862 A | * | 6/2013 |
| CN | 107485545 A | | 12/2017 |

(Continued)

OTHER PUBLICATIONS

NPL, Islam, Towhidul, et al., TaxSeeMe: A Taxi Administering System for the Visually Impaired, (https://ieeexplore.ieee.org/abstract/document/8628328), 2018 IEEE Vehicular Networking Conference (VNC) (Dec. 5, 2018) (hereinafter "Islam").*
Machine Google patents translation of Chinese Patent Pub. No. CN103126862B that was filed in 2013.*
Mauro Avila Soto, et al. "DroneNavigator: Using Leashed and Free-Floating Quadcopters to Navigate Visually Impaired Travelers" Nov. 1, 2017, published at katrinwolf.info, Baltimore, MD, USA.

(Continued)

*Primary Examiner* — Jean Paul Cass
(74) *Attorney, Agent, or Firm* — Dinsmore & Shohl LLP (57) ABSTRACT

A system for guiding an object using a robot is provided. The system includes a server and a robot. The server is configured to receive a request and a location of an object from a device of the object, instruct a vehicle to move to a first location based on the location of the object in response to receiving the request, obtain information about a second location related to a robot, and transmit information about the second location to the device of the object. The robot is configured to identify the object at the second location, and guide the object from the second location to the first location in response to identifying the object at the second location.

19 Claims, 8 Drawing Sheets

(56) References Cited

U.S. PATENT DOCUMENTS

| | | | |
|---|---|---|---|
| 9,798,325 B2 | 10/2017 | Levien et al. | |
| 9,817,395 B2 | 11/2017 | Sisbot et al. | |
| 10,068,336 B1* | 9/2018 | Zhang | G06T 7/13 |
| 10,800,548 B2* | 10/2020 | Wang | B64F 1/222 |
| 2009/0156241 A1* | 6/2009 | Staffaroni | G06Q 10/08 |
| | | | 455/466 |
| 2016/0330601 A1* | 11/2016 | Srivastava | B64C 39/024 |
| 2018/0217614 A1* | 8/2018 | Salas-Moreno | G01C 21/206 |

FOREIGN PATENT DOCUMENTS

| | | |
|---|---|---|
| CN | 108622411 A | 10/2018 |
| KR | 101810576 B1 | 12/2017 |
| WO | WO 2014/159713 A1 * | 3/2013 |

OTHER PUBLICATIONS

Bomyeong Kim, et. al., "Getting Home Safely with Drone" In Proceedings of the 2016 ACM International Joint Conference on Pervasive and Ubiquitous Computing: Adjunct, pp. 117-120. ACM, 2016.

Mauro Avila, et. al., "Drone Navigator: Using Drones for Navigating Visually Impaired Persons" In Proceedings of the 17th International ACM SIGACCESS Conference on Computers & Accessibility, pp. 327-328. ACM, 2015.

Uta R. Roentgen, et.al., "Inventory of Electronic Mobility Aids for Persons with Visual Impairments: A literature review." w, 102(11):702, 2008.

* cited by examiner

SYSTEMS AND METHODS FOR GUIDING OBJECT USING ROBOT

TECHNICAL FIELD

The present specification generally relates to systems and methods for guiding an object using a robot and, more specifically, to systems and methods for guiding a person inside a building from the current location of the person to the exact location of a vehicle using a robot such as an unmanned aerial vehicle.

BACKGROUND

People with visual impairments, people in an unfamiliar are, and/or elderly or young people may have a hard time with indoor/outdoor navigation and usage of transportation services from providers. These people may request a transportation service or try to use public transportation. However, when an expected pick-up location for a person differs from the actual location of the vehicle waiting for the person, the person may have difficulty finding the vehicle.

Accordingly, a need exists for providing seamless and precise end-to-end transportation guidance, e.g., from a cubical inside a building to the home.

SUMMARY

In one embodiment, a system for guiding an object using a robot is provided. The system includes a server and a robot. The server is configured to receive a request and a location of an object from a device of the object, instruct a vehicle to move to a first location based on the location of the object in response to receiving the request, obtain information about a second location related to a robot, and transmit information about the second location to the device of the object. The robot is configured to identify the object at the second location, and guide the object from the second location to the first location in response to identifying the object at the second location.

In another embodiment, a method for guiding an object using a robot is provided. The method includes receiving a request and a location of an object from a device of the object, instructing a vehicle to move to a first location based on the location of the object in response to the request, obtaining information about a second location related to a robot, transmitting information about the second location to the device of the object, determining whether the robot identifies the object at the second location, and instructing the robot to guide the object from the second location to the first location in response to determining that the robot identified the object at the second location.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
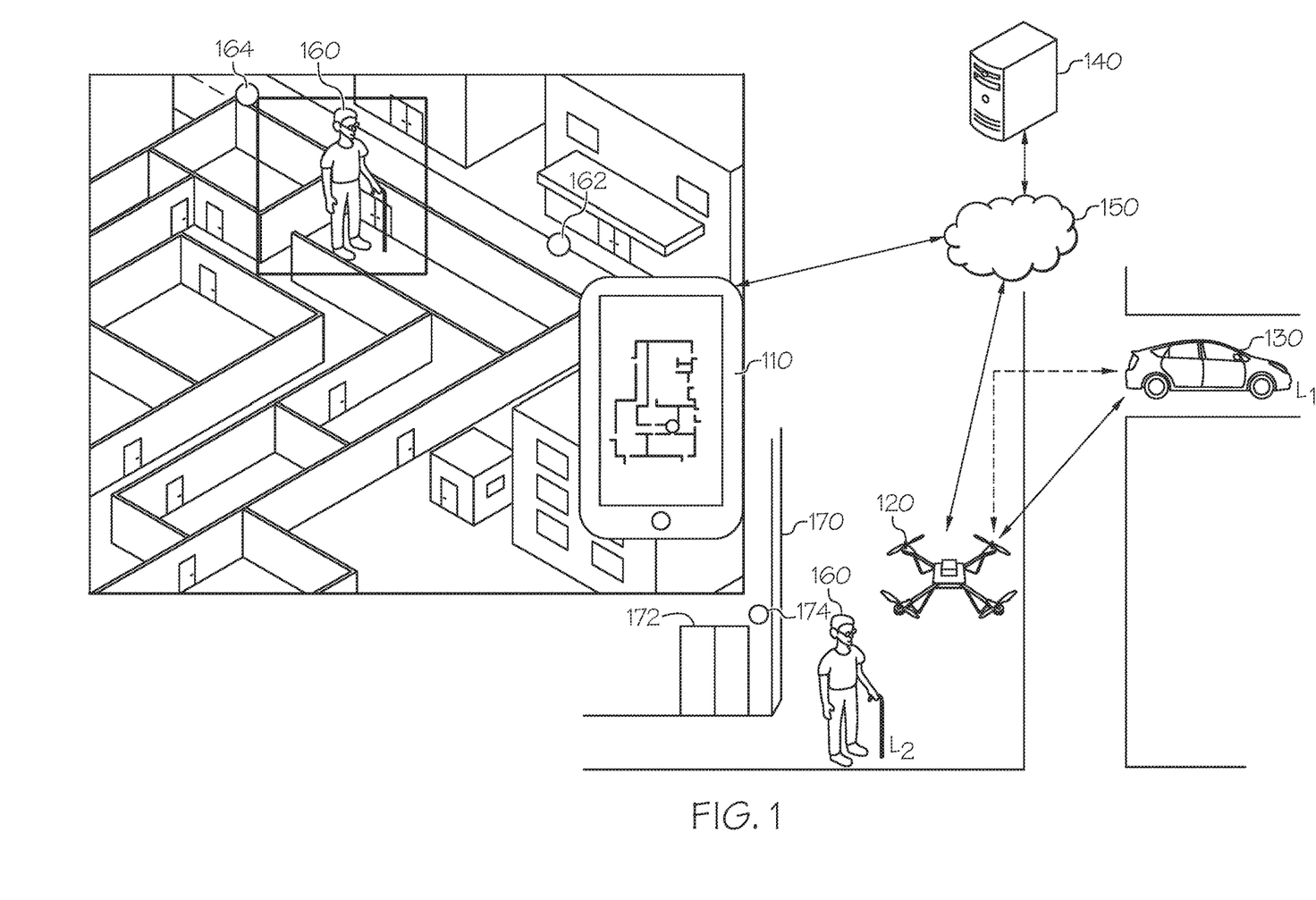
FIG. 1 depicts a system for guiding an object inside a building to a pick-up location using a robot, according to one or more embodiments shown and described herein.
Figure 2:
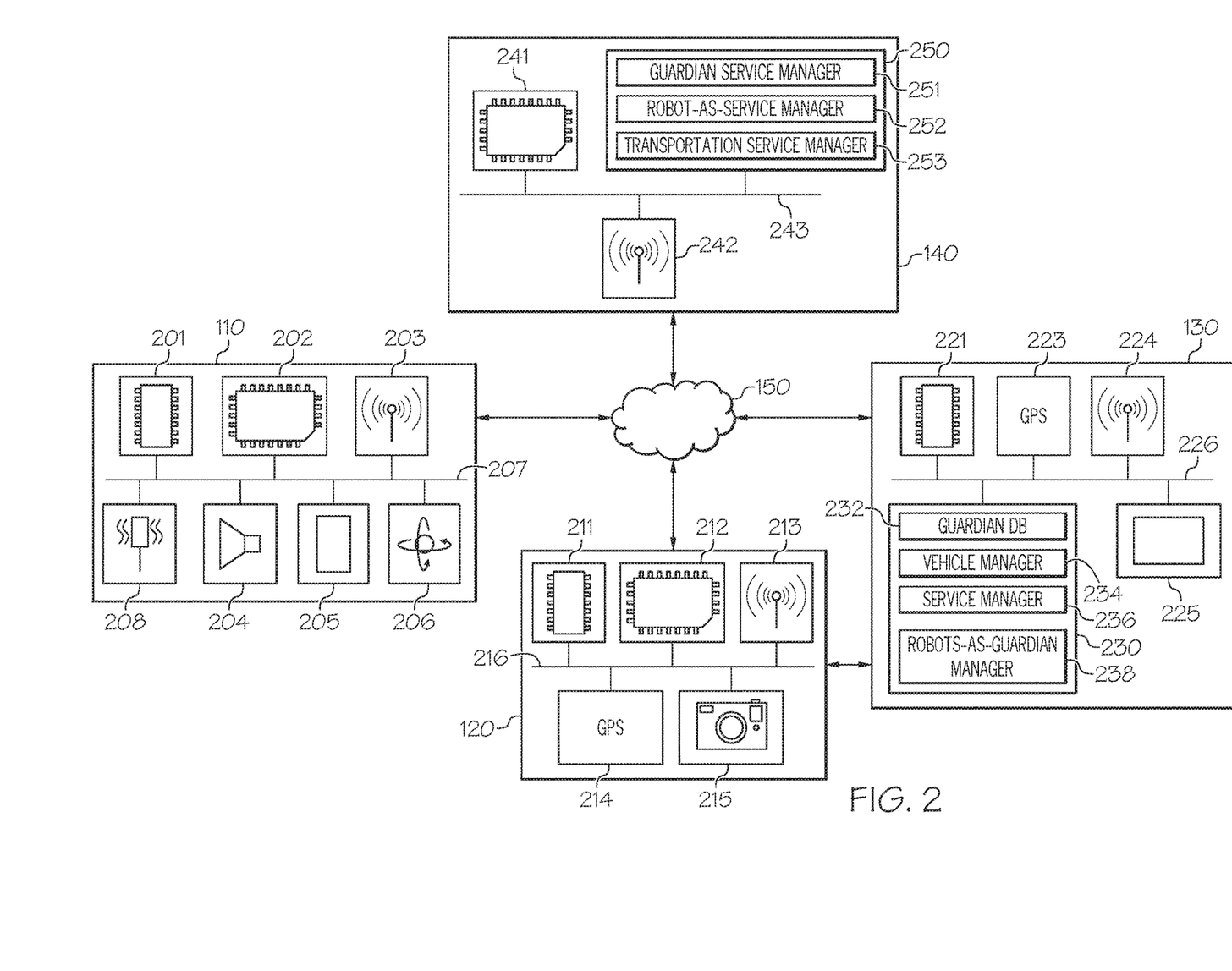
FIG. 2 depicts schematic diagrams of the system for guiding an object inside a building to a pick-up location using a robot, according to one or more embodiments shown and described herein.

The embodiments disclosed herein include systems and methods for guiding an object using a robot. Referring generally to FIGS. 1 and 2, a system for guiding an object using a robot is provided. The system includes a server 140 and a robot 120. The server 140 is configured to receive a request and a location of a user 160 from a device 110 of the user 160, instruct a vehicle 130 to move to a first location (L1) based on the location of the user 160 in response to receiving the request, obtain information about a second location (L2) related to the robot 120, and transmit information about the second location to the device 110 of the user 160. The robot 120 is configured to identify the user 160 at the second location (L2), and guide the object from the second location (L2) to the first location (L1) in response to identifying the object at the second location.

According to the present disclosure, a person is guided from a location inside a building to an outside of the building according to a smart device, for example, a smart phone, or a wearable device such as a smart watch, a smart necklace, a smart wrist, and the like. The smart device guides the person to the outside of the building by presenting a route on a map on the display of the device, or outputting audible sounds, or providing haptic feedback. A robot or an unmanned aerial vehicle accompanies the person at the outside of the building and directs him or her to the vehicle at the pick-up location. Thus, the present disclosure provides a seamless and precise end-to-end transportation service, e.g., from a location inside a building, to an exit of the building, and to the actual pick-up location.

FIG. 1 depicts, a system for guiding an object inside a building to a pick-up location using a robot, according to one or more embodiments shown and described herein. In FIG. 1, a system 100 include a device 110 for a user 160, a robot 120, a vehicle 130, and a server 140.

The vehicle 130 may be an automobile or any other passenger or non-passenger vehicle such as, for example, a terrestrial, aquatic, and/or airborne vehicle including, but not limited to, a bus, a train, a scooter, and a bicycle. In some embodiments, the vehicle 130 may be an autonomous vehicle that navigates its environment with limited human input or without human input.

The user 160 may be located inside a building. The user 160 may be a child, an elderly person, a disabled person, a visually impaired person, or a person who is not familiar with the area where she is located. The user 160 may transmit a request for transportation service via the device 110. The device 110 may be a mobile device including, but not limited to, a smartphone, a tablet, a personal media player, a wearable device such as a smart watch, a smart necklace, a smart wrist, or any other electric device that includes wireless communication functionality. The device may include a screen that displays an indoor map of the building. The location of the device 110 may be determined using a plurality of beacon devices that are located inside or outside the building, for example, beacon devices 162 and 164 in FIG. 1. While FIG. 1 depicts two beacon devices 162 and 164 in FIG. 1, more beacon devices may be placed inside the building 170 to track the location of the device 110. The location of the device 110 may be identified on a beacon map for the building as shown in FIG. 1. The request for transportation service may be transmitted to the server 140 along with the location of the device 110 via network 150.

The server 140 instructs the vehicle 130 to move to a pick-up location based on the location of the device 110. The vehicle 130 may arrive at location L2 which is close to the building 170. Then, the vehicle 130 may transmit a request for a guardian to the server 140. In response, the server 140 may find a most suitable robot (e.g., the robot 120) and instruct the robot 120 to move to the pick up location. The robot 120 may be an unmanned aerial vehicle, or a ground robot that may autonomously navigate in an area.

The robot 120 may sense one or more beacon device IDs at the building 170 and inform the server 140 of the sensed beacon device IDs. For example, the robot 120 may sense the ID of the beacon device 174 located at the building 170, and transmit information about the ID of the beacon device 174 to the server 140. The server 140 then relays the information about the beacon device ID to the device 110. The information about the beacon device ID may include the location of the beacon device. Based on the location of the beacon device, the device 110 may determine a path from the current location of the device 110 to the location of the beacon device. The device 110 may output information about the path to the user 160. For example, the device 110 may display the path on the indoor map. As another example, the device 110 may output audible sound to guide the user along the path to the location of the beacon device. As another example, the device 110 may output haptic feedback information to guide the user along the path to the location of the beacon device.

In embodiments, the robot 120 may be paired with the vehicle 130 at the pick-up location. For example, the robot 120 may be communicatively coupled with the vehicle 130. The robot 120 and the vehicle 130 may share their locations and/or identification information. The robot 120 may share with the vehicle 130 the view of the robot 120 captured by one or more imaging sensors of the robot 120. Once the robot 120 is paired with the vehicle 130, the robot 120 may not be allowed to cooperate with another vehicle. That is, the robot 120 may be prevented from guiding a person to another vehicle.

The device 110 may guide the user 160 to a location L2 that is proximate to the location of the beacon device 174. In embodiments, the information about the user 160 may be transmitted from the device 110 to the robot 120 via the server 140. The information about the user 160 may include an age, a gender, a height, a face image of the user 160, information about clothing the user 160 is wearing, or the like. The robot 120 may identify the user 160 based on the information about the user 160. For example, the robot 120 may capture an image of the user 160 at location L2 and identify the user 160 by comparing the captured image with the face image of the user 160 received from the device 110. As another example, the robot 120 may capture an image of the user 160 at location L2 and process the image to determine the gender or the height of the user 160, and identify the user 160 based on the gender and the height. As another example, the robot 120 may capture an image of the user 160 and process the image to determine the colors of the clothing the user 160 is wearing and identify the user 160 based on the colors.

Location L1 may be apart from location L2, e.g., tens of feet to hundreds of feet apart. The difference of the locations may be due to various reasons. For example, location L1 may be apart from location L2 because of a GPS error of the vehicle 130. As another example, location L1 may be apart from location L2 because of limited pick-up locations regulated by municipalities. Specifically, some municipalities may regulate pick-up or drop-off locations that may potentially cause congestion and incidents, and approved pick-up or drop-off locations may be far from a location desired by a person requesting a transportation service.

Once the robot 120 identifies the user 160, the robot 120 may guide the user 160 from location L2 to location L1 where the vehicle 130 is located. For example, the robot 120 may output audible sound that guides the user 160 to location L1. As another example, the robot 120 may output visual indicators (e.g., directions arrows) that may guide the user 160 to location L1. While the robot 120 is guiding the user 160 from location L2 to location L1, the robot 120 may capture images/videos of the user 160, and transmit the captured images/videos to the vehicle 130. The vehicle 130 may display the captured images/videos on its screen such that a driver of the vehicle 130 may see the user 160 remotely. As another example, the robot 120 may transmit the captured images/videos to the server 140, which in turn transmits the captured images/videos to a device of an authorized user. For example, if the user 160 is a child, the robot 120 may transmit the captured images/videos to the server 140, which in turn transmits the captured images/videos to the smartphone of the parents of the child. The smartphone of the parents may display a real-time view of the child.

While FIG. 1 depicts the server 140 as a remote server, in some embodiments, the server 140 may be located within the robot 120 or the vehicle 130. For example, the server 140 may be located within the robot 120, and all communication may be implemented through peer to peer communication among the device 110, the robot 120, and the vehicle 130. In some embodiments, the functionality of the server 140 is implemented with one or more computing systems, such as one or more computing system of the robot 120, the vehicle 130, and/or an additional remote computing system.

While FIG. 1 depicts guiding a person from a building to a pick-up location, the present disclosure may be also applicable to a drop-off scenario where a robot guides a person from a drop-off location to an entrance of the building. For example, the vehicle 130 may drop off a person at location L1 in FIG. 1. The robot 120 may guide the user 160 from location L1 to location L2 where an entrance of the building 170 is located. The robot 120 may be carried in or on the vehicle 130. Once the vehicle 130 arrives at location L1, the robot 120 initiates guiding the user 160 from location L1 to location L2. In some embodiments, the vehicle 130 may request a guardian when the vehicle 130 arrives at location L1 or before arriving at location L1. In response, the server 140 may find a most suitable robot (e.g., the robot 120) and instruct the robot 120 to move to the drop-off location L1.

While the robot 120 is guiding the user 160 from location L1 to location L2, the robot 120 may capture images/videos of the user 160, and transmit the captured images/videos to the vehicle 130. The vehicle 130 may display the captured images/videos on its screen such that a driver of the vehicle 130 may see the user 160 remotely. Once the robot 120 arrives at location L2, the robot 120 may instruct the device 110 for the user 160 to guide the user 160 inside the building 170.

FIG. 2 depicts schematic diagrams of the system for guiding an object inside a building to a pick-up location using a robot, according to one or more embodiments shown and described herein.

The device 110 includes one or more processors 201, one or more memory modules 202, a network interface hardware 203, an audible feedback device 204, a display 205, a satellite antenna 206, and a feedback device 208.

Each of the one or more processors 201 of the device 110 may be any device capable of executing machine readable instructions. Accordingly, each of the one or more processors 201 may be a controller, an integrated circuit, a microchip, a computer, or any other computing device. Each of the one or more processors 201 is communicatively coupled to the other components of the device 110 by a communication path 207. Accordingly, the communication path 207 may communicatively couple any number of processors with one another, and allow the components coupled to the communication path 207 to operate in a distributed computing environment. Specifically, each of the components may operate as a node that may send and/or receive data.

Each of the one or more memory modules 202 of the device 110 is coupled to the communication path 207 and communicatively coupled to the one or more processors 201. Each of the one or more memory modules 202 may comprise RAM, ROM, flash memories, hard drives, or any device capable of storing machine readable instructions such that the machine readable instructions can be accessed and executed by the one or more processors 201. The machine readable instructions may comprise logic or algorithm(s) written in any programming language of any generation (e.g., 1GL, 2GL, 3GL, 4GL, or 5GL) such as, for example, machine language that may be directly executed by the one or more processors 201, or assembly language, object-oriented programming (OOP), scripting languages, microcode, etc., that may be compiled or assembled into machine readable instructions and stored in the one or more memory modules 202. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The one or more memory modules 202 may include an indoor map of the building where the user is located and an assigned path between a current location of the user and an assigned exit of the building or a location of a beacon device as described above. The one or more processors 201 may operate the audible feedback device 204, the display 205, and/or the feedback device 208 to guide the user based on the assigned path. For example, the one or more processors 201 may instruct the audible feedback device 204 to output audible sound information the path. As another example, the one or more processors 201 may instruct the display 205 to display the path on the indoor map. As another example, the one or more processors 201 may instruct the feedback device 208 to provide haptic feedback to guide the user based on the assigned path.

Still referring to FIG. 2, the network interface hardware 203 is coupled to the communication path 207 and communicatively coupled to the one or more processors 201. The network interface hardware 203 may be any device capable of transmitting and/or receiving data via a network. Accordingly, the network interface hardware 203 can include a communication transceiver for sending and/or receiving any wired or wireless communication. For example, the network interface hardware 203 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, the network interface hardware 203 includes hardware configured to operate in accordance with the Bluetooth wireless communication protocol. In other embodiments, the network interface hardware 203 includes hardware configured to operate in accordance with a wireless communication protocol other than Bluetooth. The network interface hardware 203 of the device 110 may communicate with the server 140, the robot 120, and/or the vehicle 130.

The audible feedback device 204 may be any device capable of providing audible feedback to a user. The audible feedback device 204 may include a speaker, headphones, or the like. In some embodiments, the audible feedback may be delivered to the user with the speaker or headphones in a 3-dimensional (3D) audio placement format. In some embodiments, the audible feedback device 204 is integral with the device 110. In further embodiments, the audible feedback device 204 is located in a device separate from some or all of the other components of the device 110 and communicatively coupled with the device 110. In some embodiments, the audible feedback device 204 is not included in the device 110.

The display 205 may include any medium capable of transmitting an optical output such as, for example, a cathode ray tube, light emitting diodes, a liquid crystal display, a plasma display, or the like. Moreover, the display 205 may be a touchscreen that, in addition to providing optical information, detects the presence and location of a tactile input upon a surface of or adjacent to the display. Accordingly, the display 205 may receive mechanical input directly upon the optical output provided by the display.

Still referring to FIG. 2, a satellite antenna 206 is coupled to the communication path 207 such that the communication path 207 communicatively couples the satellite antenna 206 to other modules of the device 110. The satellite antenna 206 is configured to receive signals from global positioning system satellites. Specifically, in one embodiment, the satellite antenna 206 includes one or more conductive elements that interact with electromagnetic signals transmitted by global positioning system satellites. The received signal is transformed into a data signal indicative of the location (e.g., latitude, longitude, and altitude) of the satellite antenna 206 or an object positioned near the satellite antenna 206, by the one or more processors 201. The one or more memory modules 202 may include instructions for transmitting the location received by the satellite antenna 206 to the server 140.

The feedback device 208 may be any device capable of providing feedback to a user. The feedback device 208 may include a vibration device (such as in embodiments in which feedback is delivered through vibration), an air blowing device (such as in embodiments in which feedback is delivered through a puff of air), or a pressure generating device (such as in embodiments in which the feedback is delivered through generated pressure). In some embodiments, the feedback device 208 comprises an array of feedback devices that provide the user with more detailed feedback. For example, an array (e.g., a 2×2 array or 3×3 array) of feedback devices can provide different types of feedback to the user. In some embodiments, the feedback device 208 is wearable on the user, for example as a necklace, a belt, a wristband, a waist-pack, an adhesive, or a button. In some embodiments, the feedback device 208 is located in a device separate from some or all of the other components of the device 110 and communicatively coupled with the device 110.

The robot 120 includes one or more processors 211, one or more memory modules 212, a network interface hardware 213, a satellite antenna 214, and one or more cameras 215. Each of the one or more processors 211 of the robot 120 may be any device capable of executing machine readable instructions. Accordingly, each of the one or more processors 211 may be a controller, an integrated circuit, a microchip, a computer, or any other computing device. Each of the one or more processors 211 is communicatively coupled to the other components of the robot 120 by the communication path 216.

Each of the one or more memory modules 212 of the robot 120 is coupled to the communication path 216 and communicatively coupled to the one or more processors 211. Each of the one or more memory modules 212 may comprise RAM, ROM, flash memories, hard drives, or any device capable of storing machine readable instructions such that the machine readable instructions can be accessed and executed by the one or more processors 211. The one or more memory modules 212 may include information about the location of the user 160 in FIG. 1, the information about the user 160 such as gender, ethnicity, age, clothing information, and voice information.

Still referring to FIG. 2, the network interface hardware 213 is coupled to the communication path 216 and communicatively coupled to the one or more processors 211. The network interface hardware 213 may be any device capable of transmitting and/or receiving data via a network, similar to the network interface hardware 213. The network interface hardware 213 of the robot 120 may communicate with the server 140, the device 110, and/or the vehicle 130.

Still referring to FIG. 2, a satellite antenna 214 is coupled to the communication path 216 such that the communication path 216 communicatively couples the satellite antenna 214 to other modules of the robot 120. The satellite antenna 214 is configured to receive signals from global positioning system satellites similar to the satellite antenna 206.

Still referring to FIG. 2, one or more cameras 215 are coupled to the communication path 216 such that the communication path 216 communicatively couples the one or more cameras 215 to other modules of the robot 120. Each of the one or more cameras 215 may be any device having an array of sensing devices (e.g., pixels) capable of detecting radiation in an ultraviolet wavelength band, a visible light wavelength band, or an infrared wavelength band. Each of the one or more cameras 215 may have any resolution. The one or more cameras 215 may include an omni-directional camera, or a panoramic camera. In some embodiments, one or more optical components, such as a mirror, fish-eye lens, or any other type of lens may be optically coupled to at least one of the one or more cameras 215. The one or more cameras 215 may be used to capture an image of another unmanned aerial vehicle.

Still referring to FIG. 2, the communication path 216 may be formed from any medium that is capable of transmitting a signal such as, for example, conductive wires, conductive traces, optical waveguides, or the like, similarly to the communication path 207. Moreover, the communication path 216 may be formed from a combination of mediums capable of transmitting signals.

Now referring to the server 140, the server 140 includes one or more processors 241, one or more memory modules 250, and a network interface hardware 242. The one or more processors 241 may be processors similar to the one or more processors 201 described above. The one or more memory modules 250 may be memories similar to the one or more memory modules 202 described above. The network interface hardware 242 may be an interface hardware similar to the network interface hardware 203 described above. The communication path 243 may be a communication path similar to the communication path 207 described above. The one or more processors 241 in combination of one or more memory modules 250 may operate as an electronic control unit for the server 140.

The one or more memory modules 250 of the server 140 includes a guardian service manager module 251, a robot-as-service manager module 252, and a transportation service manager module 253. Each of the guardian service manager module 251, the robot-as-service manager module 252, and the transportation service manager module 253 may be a program module in the form of operating systems, application program modules, and other program modules stored in one or more memory modules 250. In some embodiments, the program module may be stored in a remote storage device that may communicate with the server 140. Such a program module may include, but is not limited to, routines, subroutines, programs, objects, components, data structures, and the like for performing specific tasks or executing specific data types as will be described below.

The guardian service manager module 251 is configured to obtain robot-as-guardian information from the transportation service manager module 253. The guardian service manager module 251 periodically informs the status of the elected robot to the robot-as-service manager module 252. The guardian service manager module 251 also informs the vehicle 130 of the elected robot information. The robot-as-service manager module 252 is configured to maintain the status of the elected robot.

The transportation service manager module 253 is configured to receive a transportation request from the user 160, estimate a pick-up location, and monitor the statue of the user 160. The transportation service manager module 253 may receive a robot request from the vehicle 130 and select the most suitable robot based on available information received from the robot-as-service manager module 252 and the guardian service manager module 251. The transportation service manager module 253 may inform the device 110 of the user 160 to generate a direction to the outside of the building where the user 160 is located. For example, by referring to FIG. 1, the transportation service manager module 253 may inform the device 110 of the user 160 to generate a direction from the current location of the user 160 to the location L1. The transportation service manager module 253 may periodically receive images or videos of the user 160 captured by the robot 120, and transmit the captured images or videos to another device, for example, a device authorized by the user 160.

Now referring to the vehicle 130, the vehicle 130 includes one or more processors 221, one or more memory modules 230, a satellite antenna 223, a network interface hardware 224, and a display 225. The one or more processors 221 may be processors similar to the one or more processors 201 described above. The one or more memory modules 230 may be memories similar to the one or more memory modules 202 described above. The network interface hardware 224 may be an interface hardware similar to the network interface hardware 203 described above. The satellite antenna 223 may be satellite antenna similar to the satellite antenna 206 described above. The display 225 may be a display similar to the display 205 described above. The display 225 may be configured to receive and display images or videos of the user 160 captured the robot 120. The communication path 226 may be a communication path similar to the communication path 207 described above. The one or more processors 221 in combination of one or more memory modules 230 may operate as an electronic control unit for the vehicle 130.

The one or more memory modules 230 of the vehicle 130 includes a guardian database 232, a vehicle manager module 234, a service manager module 236, and a robot-as-guardian manager module 238. Each of the guardian database 232, the vehicle manager module 234, the service manager module 236, and the robot-as-guardian manager module 238 may be a program module in the form of operating systems, application program modules, and other program modules stored in one or more memory modules 230. In some embodiments, the program module may be stored in a remote storage device that may communicate with the vehicle 130. Such a program module may include, but is not limited to, routines, subroutines, programs, objects, components, data structures, and the like for performing specific tasks or executing specific data types as will be described below.

The guardian database 232 may store robot information that is assigned by the guardian service manager module 251. The robot information may include, but not limited to, status of the robot 120, duration of guardian service, metadata of the user captured scene, and the like. The guardian database 232 may inform the vehicle manager module 234 about the elected robot-as-guardian.

The vehicle manager module 234 may receive robot-as-guardian information from the guardian database 232 and query the meta-data of the user captured scenes. The vehicle manager module 234 may inform the guardian database about information received from vehicle sensors and/or service manager.

The service manager module 236 may receive a transportation request from the transportation service manager module 253 including a pickup location, and status of the user 160 (e.g., whether the user 160 is visually impaired). The service manager module 236 may share the current location of the vehicle 130 periodically with the transportation service manager module 253. The service manager module 236 may request a robot-as-guardian when the vehicle 130 reaches or closes to the pick-up location. The service manager module 236 may observe the images or videos of the user 160 captured by the robot 120.

The robot-as-guardian manager module 238 may receive the guardian robot information from the robot 120 or from the server 140. The robot-as-guardian manager module 238 may inform the vehicle 130 about the captured scene including the user. The robot-as-guardian manager module 238 may track and/or monitor the robot movement with one or more imaging sensors of the vehicle 130.

Figure 3:
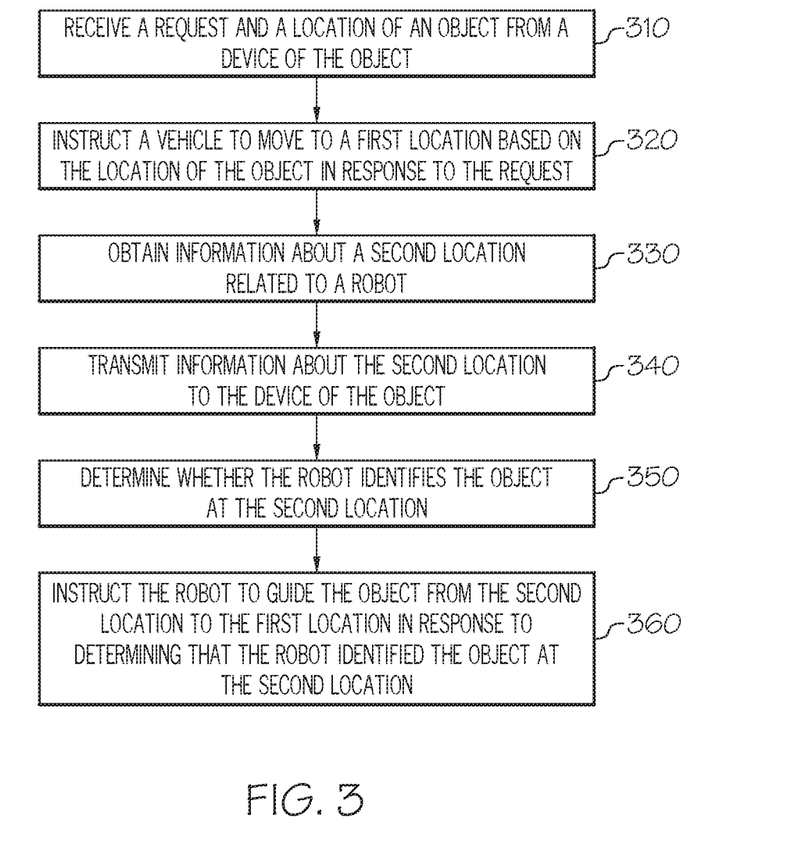
FIG. 3 is a flowchart for guiding an object inside a building to a pick-up location using a robot, according to one or more embodiments shown and described herein.
Figure 4:
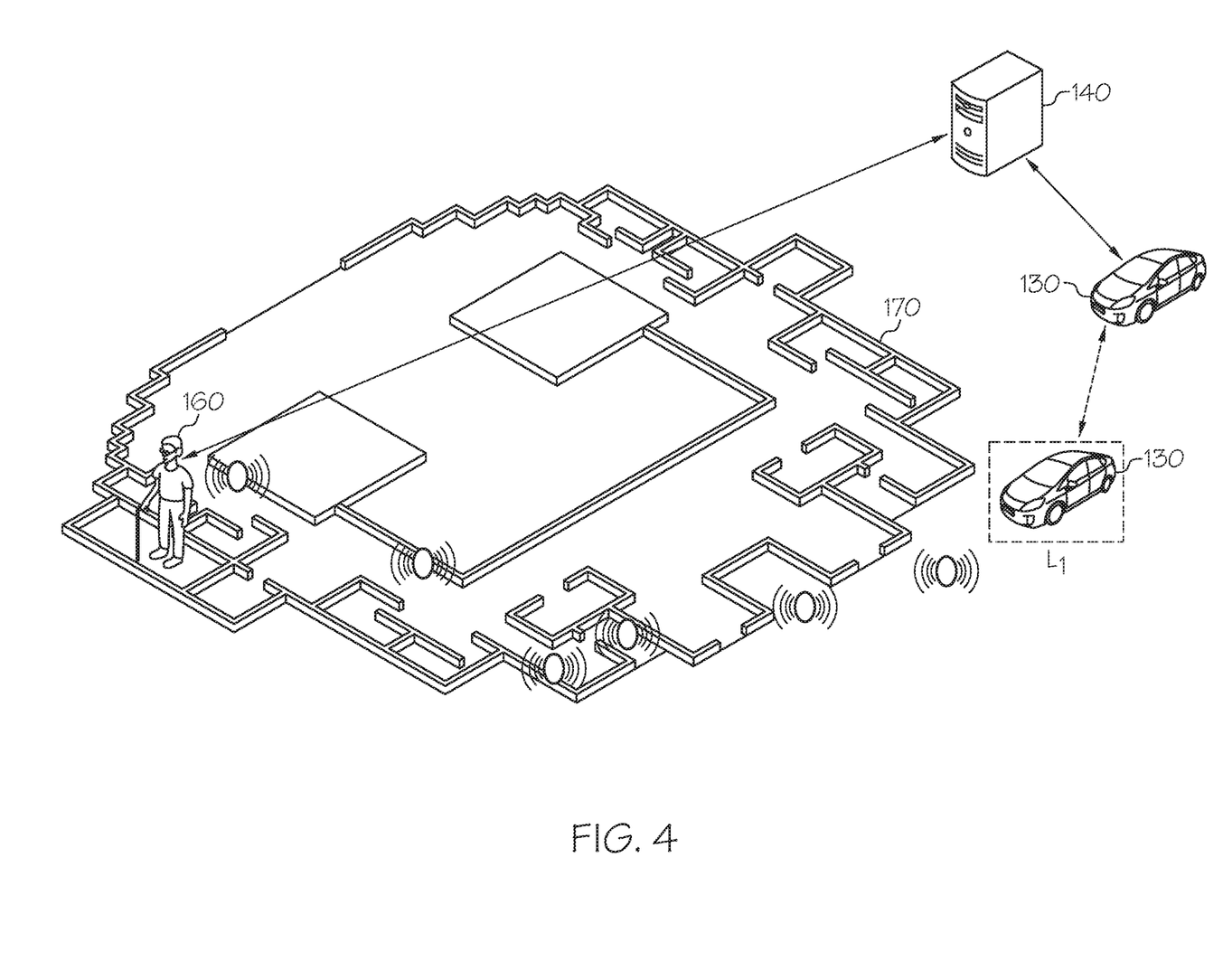
FIG. 4 depicts a scenario where a user is guided to an actual pickup location of a vehicle, according to one or more embodiments shown and described herein.

FIG. 3 is a flowchart for guiding an object inside a building to a pick-up location using a robot, according to one or more embodiments shown and described herein. In step 310, a server receives a request and a location of an object from a device of the object. For example, by referring to FIG. 4, the server 140 receives a request and the location of the user 160 from the device 110 of the user 160. The request may include a request for a transportation from a current location to a destination assigned by the user 160. The location of the user 160 may be determined based on the satellite antenna 206 of the device 110. The location of the user 160 may be a pick-up location, for example, the address of the building where the user 160 is located.

Referring back to FIG. 3, in step 320, the server instructs a vehicle to move to a first location based on the location of the object in response to the request. In embodiments, the server 140 may select the most suitable vehicle (e.g., the vehicle 130) and share the location of the user 160 and the pick-up location with the vehicle. The most suitable vehicle may be determined based on the current location, availability, and/or fees of the vehicle. By referring to FIG. 4, the vehicle 130 may arrive at location L1 based on the received location of the user 160. The location L1 may be a location proximate to the building 170. Due to GPS error and/or limited pick-up locations regulated by municipalities, the pick-up location and the location where the vehicle arrives may be different.

Figure 5:
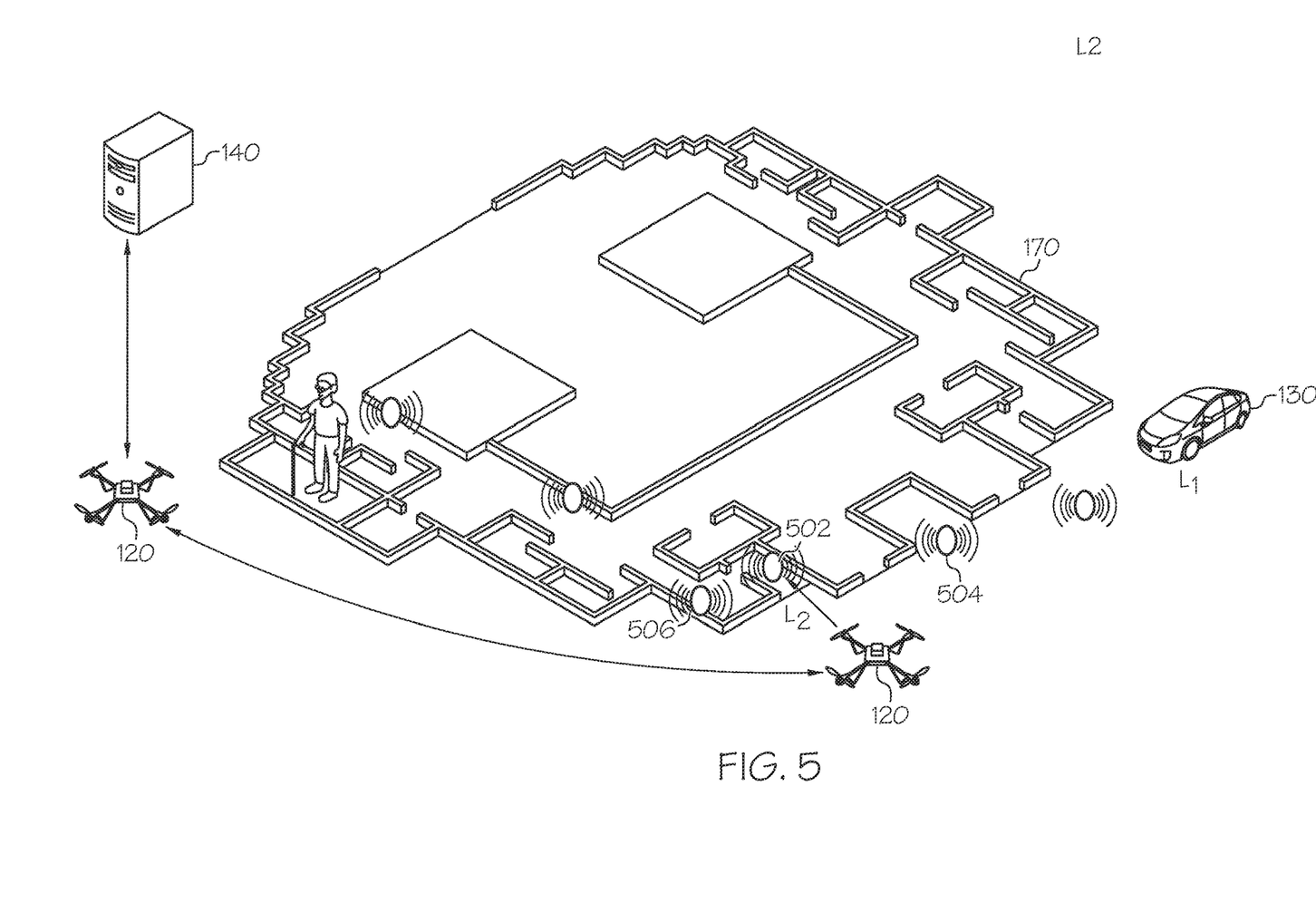
FIG. 5 depicts a scenario where a user is guided to an actual pickup location of a vehicle, according to one or more embodiments shown and described herein.

Once the vehicle 130 arrives at the location L1, the vehicle 130 may request a robot-as-guardian from the server 140. In response to the request from the vehicle 130, the server 140 may find the most suitable robot for the vehicle 130 and the user 160. The most suitable robot may be determined based on various factors including a distance from the current location of a robot to the pick up location, an estimated time of arrival at the pick-up location, the battery status of the robot, or other properties of the robot. Once the most suitable robot is determined, the server 140 may instruct the robot (e.g., the robot 120) to move to the pick-up location L2 or the building where the user 160 is located as shown in FIG. 5.

Referring back to FIG. 3, in step 330, the server 140 obtains information about a second location related to a robot. The second location related to the robot may be a location received from the robot 120 after the robot 120 arrives at a pick-up location. In embodiment, the robot 120 may move to the building 170 where the user 160 is located and obtain information about the second location L2 based on the location information of the beacon device that the robot 120 senses. For example, by referring to FIG. 5, the robot 120 may sense a beacon device 502 positioned at the exterior of the building 170 and proximate to the robot 120. The robot 120 may receive information about the beacon device 502 including the location of the beacon device 502. Then, the robot 120 may transmit the information about the sensed beacon device 502 to the server 140 including the location of the beacon device 502 as the second location. In some embodiments, the robot 120 may sense a plurality of beacon devices 502, 504, and 506 near the robot 120, and select the one that is closest to the robot 120, e.g., the beacon device 502. Then, the robot 120 may transmit the information about the selected beacon device to the server 140.

Figure 6:
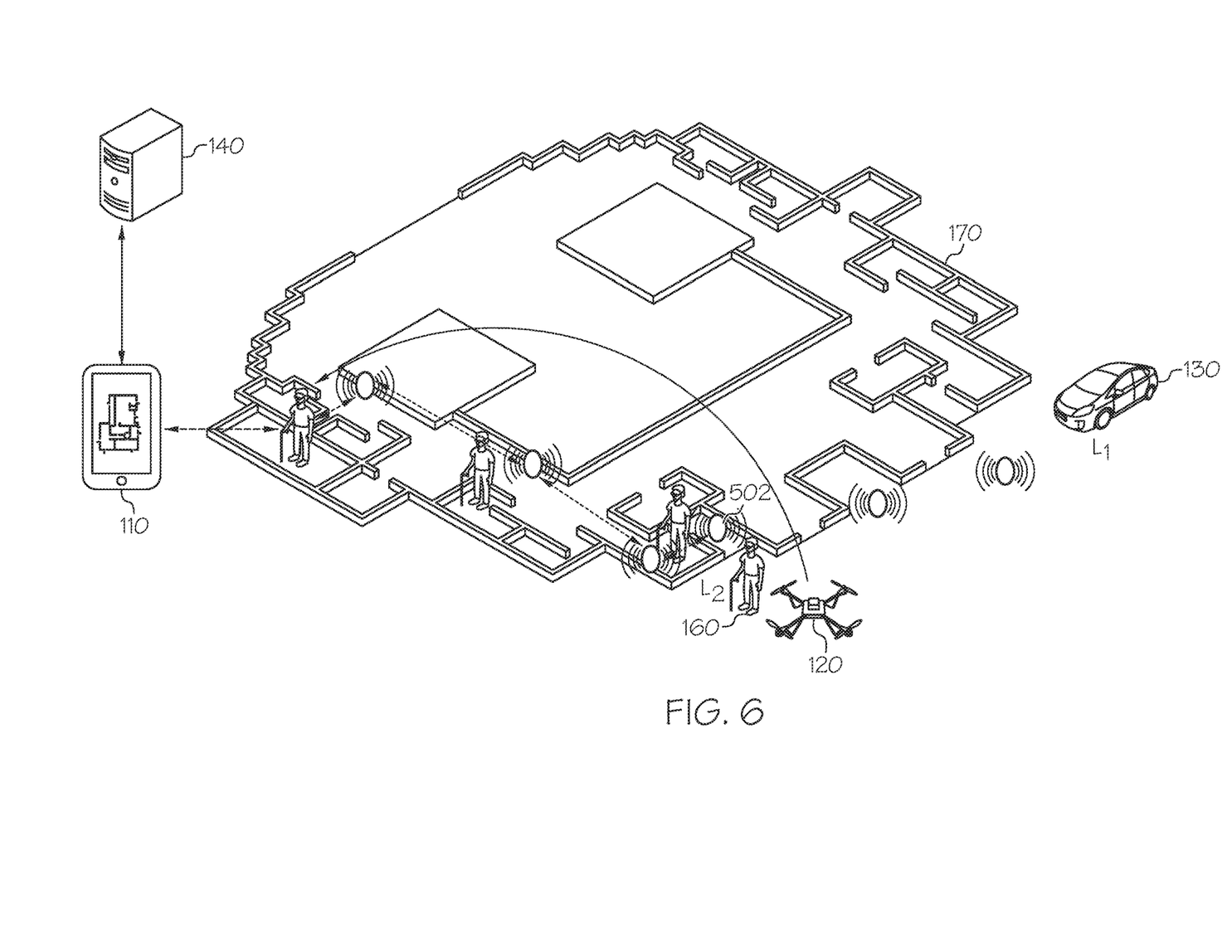
FIG. 6 depicts a scenario where a user is guided to an actual pickup location of a vehicle, according to one or more embodiments shown and described herein.

Referring back to FIG. 3, in step 340, the server 140 transmits information about the second location L2 to the device of the object. By referring to FIG. 6, the server 140 transmits the information about the second location to the device 110 of the user 160. For example, the server 140 transmits the information about the location of the beacon device 502 to the device 110. In response, the device may determine a path from the current location of the device 110 to the second location L2. The device 110 may output information about the path to the user 160. For example, the device 110 may display the path on the indoor map. As another example, the device 110 may output audible sound informing the path to location of the beacon device 502. As another example, the device 110 may output haptic feedback information the path to the location of the beacon device 502.

Referring back to FIG. 3, in step 350, it is determined whether the robot identifies the object at the second location. In embodiments, the robot 120 may search for the user 160 based on information about the user 160 and determine whether the user 160 is identified at location L2. Once the robot 120 identifies the user 160, the robot 120 is paired with the user 160. In some embodiments, the server 140 may determine whether the robot 120 identifies the user 160 at the second location L2 based on communication with the robot 120.

In step 360, the server instructs the robot to guide the object from the second location to the first location in response to determining that the robot identified the object at the second location. By referring to FIG. 7, when it is determined that the robot identified the user 160 at the second location, e.g., location L2, the server 140 instructs the robot 120 to guide the user 160 from location L2 to location L1 where the vehicle 130 is located. In embodiments, the robot 120 may be an unmanned aerial vehicle flying over the user 160 and the vehicle 130 such that the unmanned aerial vehicle is able to see the user 160 and the vehicle 130 simultaneously within its view.

Figure 7:
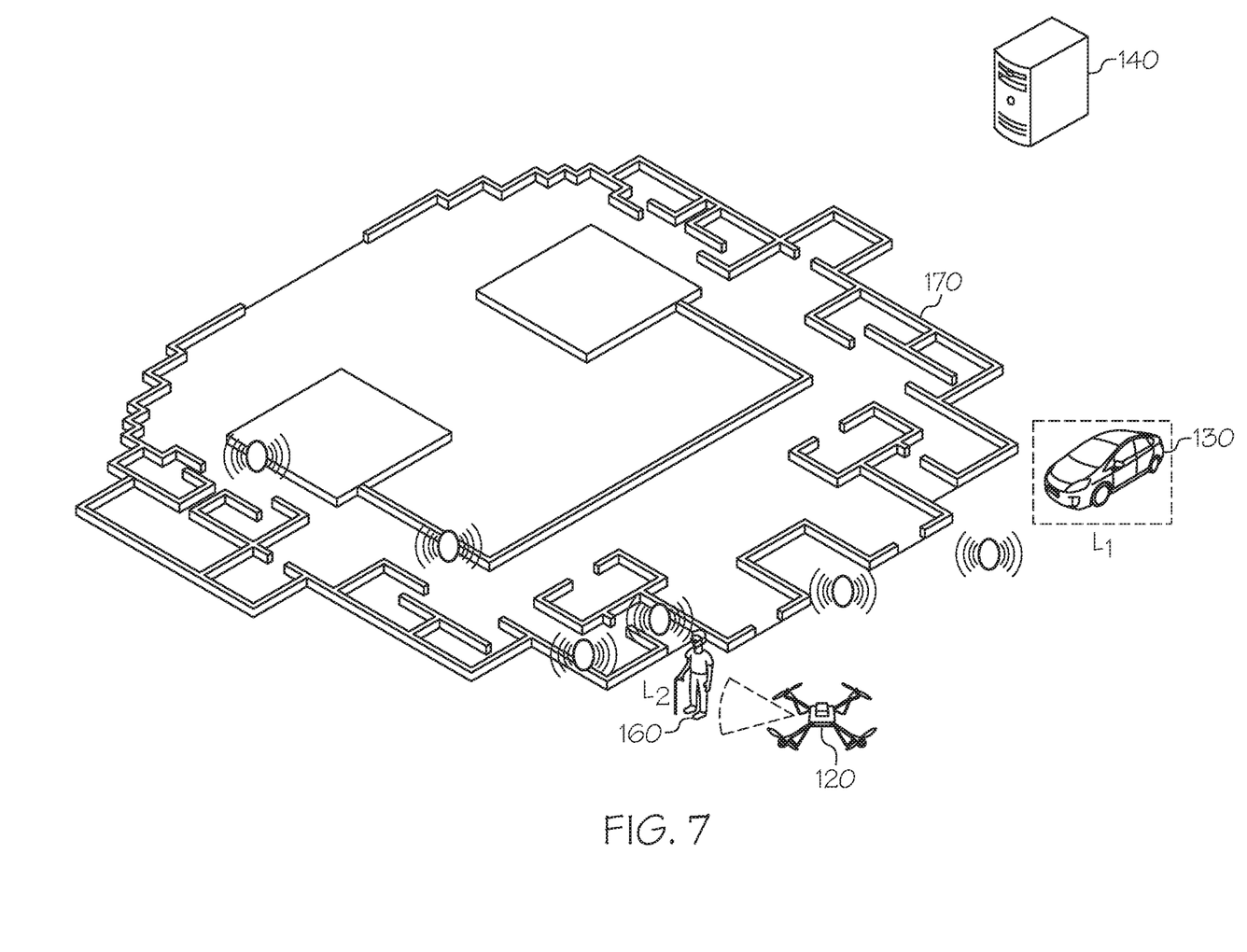
FIG. 7 depicts a scenario where a user is guided to an actual pickup location of a vehicle, according to one or more embodiments shown and described herein.

The robot 120 may guide the user 160 to location L1 using various output devices. For example, the robot 120 may output audible sound that guide the user 160 to location L1. As another example, the robot 120 may output visual indicators (e.g., directions arrows) that may guide the user 160 to location L1.

In embodiments, once the robot 120 completes guiding the user 160 to location L1, that is, once the user 160 arrives at and/or enters the vehicle 130 at location L1, the robot 120 may follow the vehicle 130 as the vehicle 130 moves toward the destination requested by the user 160. For example, the robot 120 may dock onto the top of the vehicle 130. As another example, the robot 120 may be placed in a container of the vehicle, e.g., the trunk of the vehicle 130. When the vehicle 130 arrives at the destination requested by the user 160, the robot 120 may reinitiate guiding procedures, e.g., guiding the user 160 from the destination to a next location (e.g., a door to a house, an entrance to a hotel, and the like).

In some embodiments, once the robot 120 completes guiding the user 160 to location L1, the robot 120 may return to a designated location waiting for another guidance request. The designated location may be a parking area for the robot 120 where the robot 120 may be charged by a charger at the parking area. The robot 120 may be dispatched to a pick-up location once the robot 120 receives another guidance request from the server 140.

Figure 8:
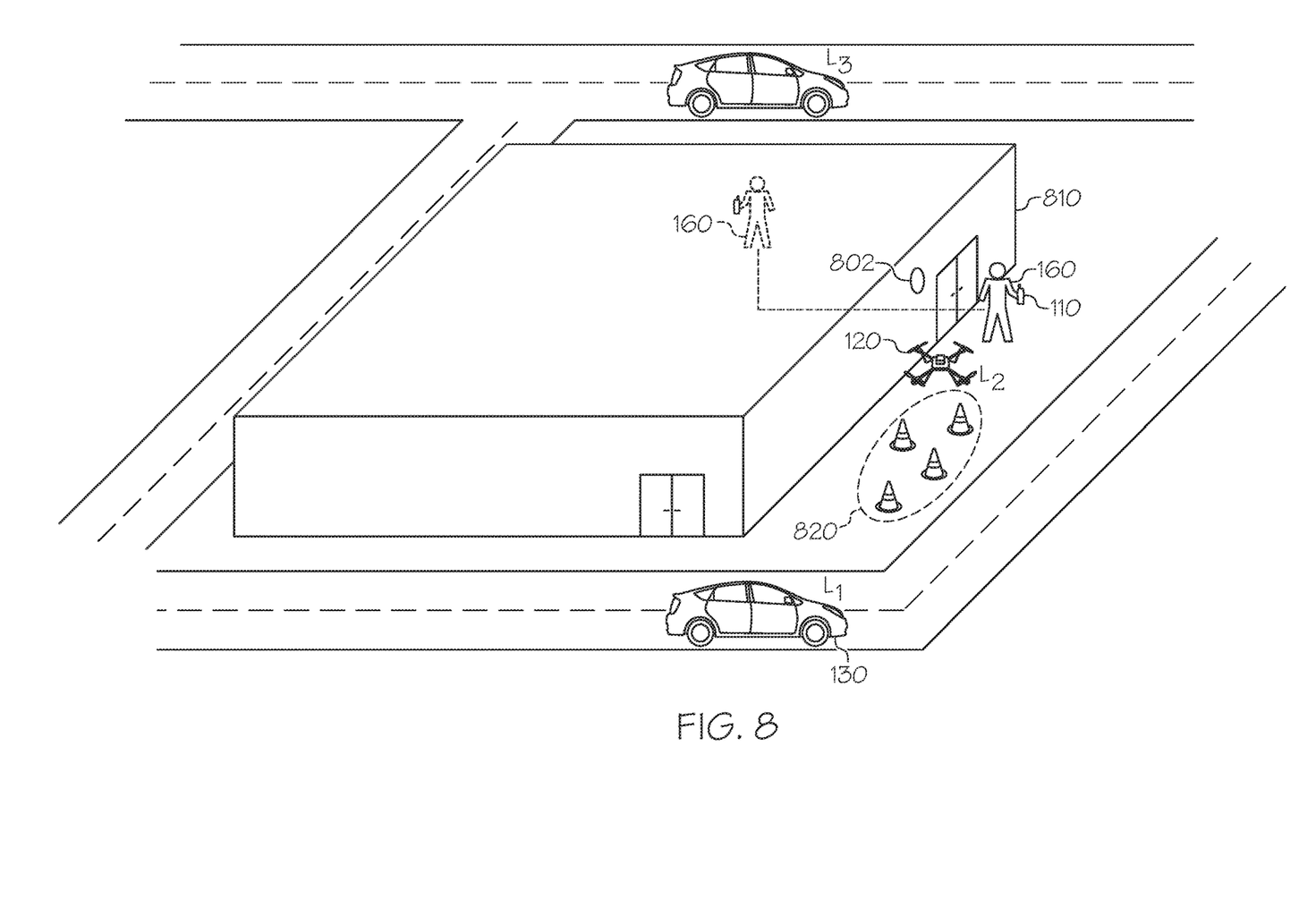
FIG. 8 depicts a scenario where another pick location is suggested due to a barrier, according to one or more embodiments shown and described herein.

FIG. 8 depicts a scenario where another pick location is suggested due to a barrier, according to one or more embodiments shown and described herein.

In embodiments, in response to a transportation request from the device 110 of the user 160, the vehicle 130 may arrive at location L1 which is close to the building 810. Then, the vehicle 130 transmits a request for a guardian to the server 140. In response, the server 140 may find a most suitable robot (e.g., the robot 120) and instruct the robot 120 to move to the pick up location.

When the robot 120 is proximate to the building 810, the robot 120 may sense an available beacon device (e.g., a beacon device 802) and transmits the information about the beacon device 802, including the location of the beacon device 802, to the server 140. The server 140 then relays the information about the beacon device 802 to the device 110. The information about the beacon device 802 may include the location of the beacon device 802. Based the location of the beacon device 802, the device 110 may determine a path from the current location of the device 110 to the location of the beacon device 802. The device 110 may output information about the path to the user 160.

The device 110 may guide the user 160 to a location L2 which is proximate to the location of the beacon device 802. The robot 120 may identify the user 160 based on information about the user 160. Once the robot 120 identifies the user 160, the robot 120 may guide the user 160 from location L2 to location L1 where the vehicle 130 is located. In this embodiment, the robot 120 may identify a barrier (e.g., a construction site 820) on a route from location L2 to location L1. The robot 120 may request another pick-up location from the server. In response, the server 140 may determine another pick-up location. For example, another pick-up location may be determined, for example, based on a database maintaining curbside data platforms. In FIG. 8, the server suggests location L3 as alternative pick-up location. The server 140 may transmit information about location L3 such that the vehicle 130 moves to location L3. Once the vehicle 130 arrives at location L3 or while the vehicle 130 is moving form location L1 to location L3, the robot 120 may guide the user 160 from location L2 to location L3. For example, the robot 120 may output audible sounds that guide the user 160 to location L3. As another example, the robot 120 may output visual indicators (e.g., directions arrows) that may guide the user 160 to location L3.

While FIG. 8 depicts a construction site as a barrier, the barrier may be any barrier that may make it difficult for the user 160 to follow a path. For example, stairs may be determined to be present on a path from the current location of the user 160 to the location where the vehicle is location. If it is determined that the user 160 is an elderly person or a disabled person, the robot 120 may request the change of the location where the vehicle is waiting for the user 160.

It should be understood that embodiments described herein are directed to methods and systems for guiding an object inside a building to a pick-up location using a robot. A system includes a server and a robot. The server is configured to receive a request and a location of an object from a device of the object, instruct a vehicle to move to a first location based on the location of the object in response to receiving the request, obtain information about a second location related to a robot, and transmit information about the second location to the device of the object. The robot is configured to identify the object at the second location, and guide the object from the second location to the first location in response to identifying the object at the second location. According to the present disclosure, a robot or an unmanned aerial vehicle accompanies the person at the outside of a building and directs him or her to the vehicle at the pick-up location. Thus, the present disclosure provides a seamless and precise end-to-end transportation service.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for guiding an object using a robot, the system comprising:
   a server configured to:
   receive a request and a location of an object from a device of the object, the location of the object being a location inside a building;
   instruct a vehicle to move to a first location based on the location of the object in response to receiving the request;
   instruct a robot to move to a second location and stay at the second location;
   receive a location of a beacon device, the location of the beacon device being at an exterior of the building; and
   instruct the device of the object to output information about a route from the location of the object to the location of the beacon device.

2. The system of claim 1, wherein the robot is an unmanned aerial vehicle.

3. The system of claim 1, wherein the robot includes one or more imaging sensors configured to capture one or more images of the object; and
   the robot is communicatively coupled to the vehicle and configured to transmit the one or more images to the vehicle.

4. The system of claim 1, further comprising a plurality of beacons located within the building,
   wherein the plurality of beacons determine the location of the object within the building.

5. The system of claim 4, wherein the device displays a route from the location of the object to the second location on an indoor map of the building or output audible sound information the route.

6. The system of claim 1, wherein:
   the robot is configured to:
   obtain information about conditions of a path from the second location to the first location; and
   instruct the vehicle to move to a third location based on the information about conditions of the path from the second location to the first location.

7. The system of claim 1, wherein the server is configured to receive identification information about the object, and transmit the identification information about the object to the robot;
   the robot is configured to identify the object at the second location based on the identification information; and
   the identification information includes at least one of gender, ethnicity, age, clothing information, and voice information.

8. The system of claim 1, wherein the robot is configured to:
   identify the vehicle at the first location; and
   guide the object from the second location to the first location in response to identifying the vehicle at the first location.

9. The system of claim 1, wherein the robot is docked to the vehicle or moved to a predetermined location in response to the object arriving at the first location.

10. The system of claim 1, wherein the first location is different from the second location and the second location is different from the location of the object.

11. The system of claim 10, wherein the second location is a location proximate to an entrance of the building, and the first location is a location at a side of a road.

12. A method for guiding an object using a robot, the method comprising:
    receiving a request and a location of an object from a device of the object, the location of the object being a location inside a building;
    instructing a vehicle to move to a first location based on the location of the object in response to the request;
    instructing a robot to move to a second location and stay at the second location;
    receiving a location of a beacon device, the location of the beacon device being at an exterior of the building;
    instructing the device of the object to output information about a route from the location of the object to the location of the beacon device; and
    instructing the robot to guide the object from the location of the beacon device to the first location in response to the robot identifying the object at the second location.

13. The method of claim 12, wherein the robot is an unmanned aerial vehicle.

14. The method of claim 12, further comprising:
    selecting the vehicle and the robot based on the location of the object and locations of the vehicle and the robot.

15. The method of claim 12, further comprising:
    instructing the robot to capture one or more images of the object; and
    instructing the robot to transmit the one or more images to the vehicle while guiding the object from the second location to the first location.

16. The method of claim 12, further comprising:
    obtaining identification information about the object;
    transmitting the identification information about the object to the robot; and
    instructing the robot to identify the object at the second location based on the identification information.

17. The method of claim 12, further comprising:
    instructing the robot to identify the vehicle at the first location; and
    instructing the robot to guide the object from the second location to the first location in response to identifying the vehicle at the first location.

18. The method of claim 12, wherein the second location is a location proximate to an entrance of the building, and the first location is a location at a side of a road.

19. The system of claim 1, wherein the server configured to:
    instruct the robot to guide the object from the location of the beacon device to the first location in response to the robot identifying the object at the second location.

* * * * *